United States Patent [19]
Obara

[11] Patent Number: 5,841,210
[45] Date of Patent: *Nov. 24, 1998

[54] ELECTRIC DRIVE MOTOR WITH A COMPOUND BEARING ASSEMBLY

[75] Inventor: Rikuro Obara, Nagano-ken, Japan

[73] Assignee: Minebea Kabushiki-Kaisha, Nagano-ken, Japan

[*] Notice: The term of this patent shall not extend beyond the expiration date of Pat. No. 5,655,846.

[21] Appl. No.: 694,232

[22] Filed: Aug. 8, 1996

[30] Foreign Application Priority Data

Aug. 9, 1995 [JP] Japan ................................. 7-224761
Aug. 9, 1995 [JP] Japan ................................. 7-224762

[51] Int. Cl.$^6$ ................................................ H02K 5/16
[52] U.S. Cl. ..................... 310/90; 310/67 R; 384/512; 384/513; 384/504
[58] Field of Search ..................... 310/67 R, 90; 384/512, 513, 504, 520

[56] References Cited

U.S. PATENT DOCUMENTS

| | | | |
|---|---|---|---|
| 5,128,571 | 7/1992 | Itsu | 310/67 R |
| 5,138,209 | 8/1992 | Chuta et al. | 310/67 R |
| 5,509,198 | 4/1996 | Takamizawa et al. | 29/898.09 |
| 5,510,661 | 4/1996 | Yoshimura et al. | 310/90 |
| 5,547,291 | 8/1996 | Miyazaki et al. | 384/512 |
| 5,556,209 | 9/1996 | Obara et al. | 384/504 |
| 5,560,717 | 10/1996 | Obara et al. | 384/512 |
| 5,599,111 | 2/1997 | Miyazaki et al. | 384/512 |
| 5,655,846 | 8/1997 | Obara | 364/520 |

*Primary Examiner*—Steven L. Stephan
*Assistant Examiner*—Michael J. Wallace, Jr.
*Attorney, Agent, or Firm*—Lowe Hauptman Gopstein Gilman & Berner

[57] ABSTRACT

In the motor, the compound bearing assembly is assembled from stepped-diameter shaft 1, sleeve-like outer race ring 5, first balls 4, second balls 8a, and inner race ring 7 a, and has a base-end portion of large-diameter portion 1a of the stepped-diameter shaft 1 fixedly mounted on a base member 10 of the motor at right angles to permit the stepped-diameter shaft 1 to extend upward. After that, the compound bearing assembly is fixedly mounted in a central hub portion 12 of a rotor 11 of the motor in an insertion manner to complete the motor provided with the compound bearing assembly. Consequently, it is easy for the motor manufacturer to assemble his product or motor with the compound bearing assembly at high accuracy. (See FIG. 1)

6 Claims, 4 Drawing Sheets

ELECTRIC DRIVE MOTOR WITH A COMPOUND BEARING ASSEMBLY

BACKGROUND OF THE INVENTION

1. Field of the Invention

The present invention relates to an electric drive motor with a compound bearing assembly used in rotating portions of a computer and its peripheral devices.

2. Description of the Prior Art

In the motor used in the computer and its peripheral devices, the bearing assembly is mounted between a motor shaft and a hub portion of a rotor.

In a conventional type of the compound bearing assembly, as shown in FIG. 7(a), a pair of conventional ball bearing units A, B and a sleeve-like spacer C are separately produced and delivered to a user such as a motor manufacturer who in turn mounts these delivered components A, B, C on a motor shaft D of an electrical drive motor to assemble a compound bearing assembly, as shown in FIG. 7(b).

As described above, in the conventional bearing assembly, it is necessary for the user to mount the pair of the conventional ball bearing units A, B and the spacer C on the motor shaft D in a condition in which the ball bearing units A, B are spaced apart from each other through the spacer C. Consequently, the conventional bearing assembly suffers from the following problems:
(a) While keeping a sufficient rigidity, the motor shaft D is required to be sized in outer diameter so as to engage with the inner race rings of the ball bearing units A, B;
(b) Since the spacer C is a separate component independent of the pair of the ball bearing units A and B, it is necessary for the spacer C to have its opposite end surfaces improved in parallelism therebetween and also in flatness thereof, taken in connection with the dimensions of the ball bearing units A, B being assembled together with the spacer C;
(c) Since the spacer C is merely sandwiched between a pair of outer race rings of the ball bearing units A and B, it is necessary for the user to have the spacer C coaxially mounted on the motor shaft D with high accuracy, and to have the axially opposite end surfaces of the spacer C brought into uniform area contact with the corresponding axially inward end surfaces of the outer race rings, which involves the user in cumbersome machining and assembling works; and
(d) Unless all the above requirements are fulfilled, the motor suffers from vibrations, and is therefore poor in performance.

SUMMARY OF THE INVENTION

It is an object of the present invention to solve the above problems by providing an electric drive motor with a compound bearing assembly in which a plurality of components of the bearing assembly are already assembled to release the user of the bearing assembly (i.e., motor manufacturers) from its cumbersome assembling work, which enables the user to provide a high-performance electric drive motor.

According to a first aspect of the present invention, the above object of the present invention is accomplished by providing:

An electric drive motor with a compound bearing assembly comprising:
a stepped-diameter shaft provided with a large-diameter portion, a small-diameter portion and an annular inner raceway groove directly formed in an outer peripheral surface of the large-diameter portion, the small-diameter portion being fitted in an annular inner race ring in an insertion manner;
an elongated sleeve-like outer race ring partially covering the stepped-diameter shaft and provided with a single-piece first short outer race ring in one of its axially opposite end portions the other of which has its inner peripheral surface directly formed into an annular outer raceway groove;
a plurality of first balls rotatably mounted in the inner raceway groove of the large-diameter portion of the stepped-diameter shaft and held therein by an annular outer raceway groove of the first short outer race ring;
a plurality of second balls rotatably mounted in an annular inner raceway groove formed in an outer peripheral surface of the inner race ring, the second balls being held therein by an annular outer raceway groove directly formed in an inner peripheral surface of the sleeve-like outer race ring;
whereby the compound bearing assembly is assembled from the above-enumerated components;
the compound bearing assembly having a base-end portion of the large-diameter portion thereof fixedly mounted on a base member of a motor at right angles to permit the stepped-diameter shaft to extend upward; and
the compound bearing assembly being fixedly mounted in a central hub portion of a rotor of the motor in an insertion manner to complete the motor provided with the compound bearing assembly.

According to a second aspect of the present invention, the above object of the present invention is accomplished by providing:

An electric drive motor with a compound bearing assembly comprising:
a stepped-diameter shaft provided with a large-diameter portion, a small-diameter portion and an annular inner raceway groove directly formed in an outer peripheral surface of the large-diameter portion, the small-diameter portion being fitted in an annular inner race ring in an insertion manner;
an elongated sleeve-like outer race ring partially covering the stepped-diameter shaft and provided with a single-piece first short outer race ring in one of its axially opposite end portions the other of which has its inner peripheral surface directly formed into an annular outer raceway groove;
a plurality of first balls rotatably mounted in the inner raceway groove of the large-diameter portion of the stepped-diameter shaft and held therein by an annular outer raceway groove formed in an inner peripheral surface of the sleeve-like outer race ring;
a plurality of second balls rotatably mounted in an annular inner raceway groove formed in an outer peripheral surface of the inner race ring, the second balls being held therein by an annular outer raceway groove formed in an inner peripheral surface of a second short outer ring;
whereby the compound bearing assembly is assembled from the above-enumerated components;
the compound bearing assembly having a base-end portion of the large-diameter portion thereof fixedly mounted on a base member of a motor at right angles to permit the stepped-diameter shaft to extend upward; and the compound bearing assembly being fixedly mounted in a central hub portion of a rotor of the motor in an insertion manner to complete the motor provided with the compound bearing assembly.

According to a third aspect of the present invention, the above object of the present invention is accomplished by providing:

An electric drive motor with a compound bearing assembly characterized in that:

an annular inner raceway groove is directly formed in an outer peripheral surface of a large-diameter portion of a stepped-diameter shaft provided with the large-diameter portion and a small-diameter portion;

a plurality of first balls are rotatably mounted between the inner raceway groove and an annular outer raceway groove formed in an inner peripheral surface of a first short outer race ring disposed over the large-diameter portion of the stepped-diameter shaft;

a plurality of second balls are rotatably mounted between the inner race ring and a second short outer race ring in a ball bearing unit;

a sleeve-like spacer is sandwiched between the second short outer race ring and the first short outer race ring over the large-diameter portion of the stepped-diameter shaft;

the inner race ring of the ball bearing unit is fixedly mounted on the small-diameter portion of the stepped-diameter shaft in an insertion manner;

whereby a compound bearing assembly is assembled;

the compound bearing assembly has a base-end portion of the large-diameter portion of the stepped-diameter shaft fixedly mounted on a base member of a motor at right angles to permit the stepped-diameter shaft to extend upward; and the compound bearing assembly is fixedly mounted in a central hub portion of a rotor of the motor in an insertion manner to complete an electric drive motor with the compound bearing assembly.

Incidentally, in the compound bearing assembly of the motor according to the first aspect of the present invention, an outer diameter of the inner race ring fixedly mounted on the small-diameter portion of the stepped-diameter shaft is equal to that of the large-diameter portion of the stepped-diameter shaft so that all the first and the second balls are the same in diameter.

Further, in the compound bearing assembly of the motor according to the second and the third aspect of the present invention, an outer diameter of the inner race ring of the ball bearing unit is equal to that of the large-diameter portion of the stepped-diameter shaft, while an outer and an inner diameter of the outer race ring of the ball bearing unit are equal to those of the sleeve-like outer race ring, respectively. Consequently, all the first and the second balls are the same in diameter.

BRIEF DESCRIPTION OF THE DRAWINGS

FIG. 7($b$) is a longitudinal sectional view of the conventional bearing assembly after assembled, illustrating the ball bearing units and the spacer thus assembled on the motor shaft.

DESCRIPTION OF THE PREFERRED EMBODIMENTS

Hereinbelow, the present invention will be described in detail with reference to the accompanying drawings.

Figure 1:
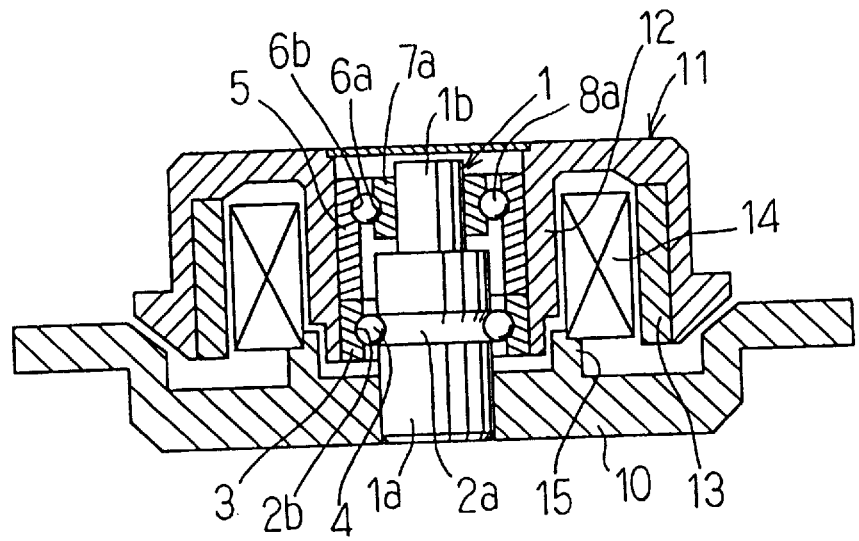
FIG. 1 is a longitudinal sectional view of a first embodiment of the electric drive motor of an outer-rotor type with the compound bearing assembly, according to the present invention.

FIG. 1 shows a first embodiment of an electric drive motor of the present invention of an outer-rotor type with a compound bearing assembly.

In FIG. 1: the reference numeral 1 denotes a stepped-diameter shaft 1 provided with a large-diameter portion 1$a$ and a small-diameter portion 1$b$. Directly formed in an outer peripheral surface of the large-diameter portion 1$a$ is an annular inner raceway groove 2$a$.

The reference numeral 3 denotes a first short outer race ring which has its inner peripheral surface formed into an annular outer raceway groove 2$b$. The first short outer race ring 3 is disposed on the large-diameter portion 1$a$ of the stepped-diameter shaft 1, so that a plurality of first balls 4 are rotatably mounted between the outer raceway groove 2$b$ of the first short outer race ring 3 and the inner raceway groove 2$a$ of the large-diameter portion 1$a$ of the stepped-diameter shaft 1.

The reference numeral 5 denotes a sleeve-like outer race ring disposed around the stepped-diameter shaft 1. Directly formed in an inner peripheral surface of an upper-end portion of the sleeve-like outer race ring 5 is an annular outer raceway groove 6$b$. A plurality of second balls 8$a$ are rotatably mounted between this outer raceway groove 6$b$ and an annular inner raceway groove 6$a$ formed in an outer peripheral surface of an inner race ring 7$a$ which is fixedly mounted on the small-diameter portion 1$b$ of the stepped-diameter shaft 1 in an insertion manner.

Further, as is clear from FIG. 1, an outer diameter of the inner race ring 7$a$ on the small-diameter portion 1$b$ of the stepped-diameter shaft 1 is equal to that of the large-diameter portion 1$a$ of the shaft 1 to permit all the first and the second balls 4, 8$a$ to be the same in diameter.

In assembly operations of this first embodiment of the motor of the present invention, for example, the inner race ring 7$a$ is initially slidably mounted on the small-diameter portion 1$b$ of the stepped-diameter shaft 1 in an insertion manner. Then, a predetermined pre-load is applied to an upper-end surface of the thus mounted inner race ring 7$a$. Under, such circumstances, the inner race ring 7$a$ is fixed to the small-diameter portion 1$b$ of the shaft 1 by means of an adhesive or a suitable connecting means. Thus the inner race ring 7a, first short outer race ring 3 and the sleeve-like outer race ring 5 are successively mounted on the stepped-diameter shaft 1 to complete a compound bearing assembly used in the motor of the present invention.

Then, the thus assembled compound bearing assembly has a base-end portion of the large-diameter portion 1a of the shaft 1 thereof fixedly mounted on a base member 10 of the motor at right angles to permit the shaft 1 to extend upward from the base member 10 of the motor, and then has its outer race rings 3, 5 firmly fitted in a central hub portion 12 of a rotor 11 of the motor in an insertion manner so that the electric drive motor of the present invention with the compound bearing assembly is completed.

Incidentally, in FIG. 1: the reference numeral 13 denotes a permanent magnet; 14 an electric energizing coil wound around a stator yoke (not shown) of the motor; and, 15 a yoke holder.

Figure 2:
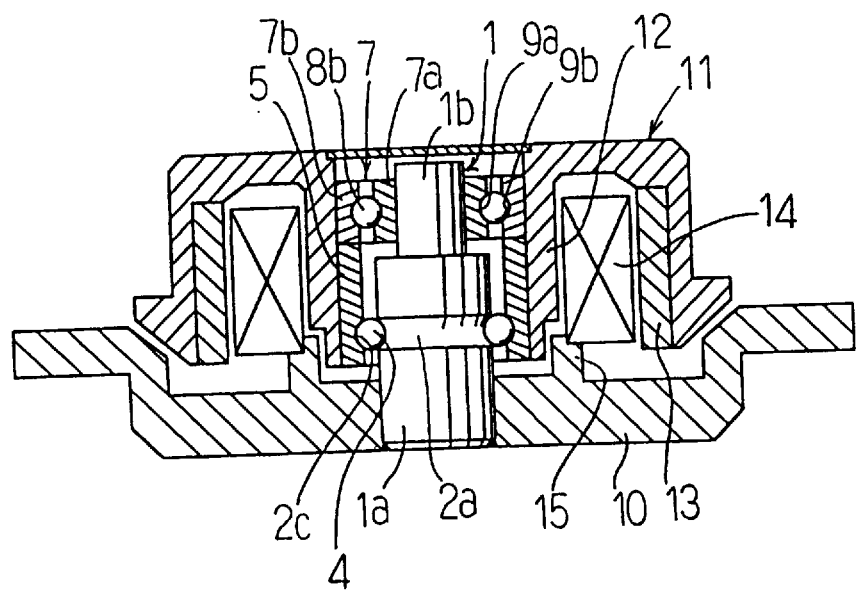
FIG. 2 is a longitudinal sectional view of a second embodiment of the electric drive motor of the outer-rotor type with the compound bearing assembly, according to the present invention.

FIG. 2 shows a second embodiment of the outer-rotor type motor of the present invention provided with another compound bearing assembly.

In this second embodiment of the motor of the present invention, the annular inner raceway groove 2a formed in the outer peripheral surface of the large-diameter portion 1a of the stepped-diameter shaft 1 is also used.

Directly formed in an inner peripheral surface of a lower-end portion of the sleeve-like outer race ring 5 disposed around the stepped-diameter shaft 1 is the annular outer raceway groove 2c. The plurality of the first balls 4 are rotatably mounted between this outer raceway groove 2c and the inner raceway groove 2a of the large-diameter portion 1a of the shaft 1.

A conventional ball bearing unit 7 is essentially constructed of the inner race ring 7a, a second short outer race ring 7b and a plurality of third balls 8b rotatably mounted between these race rings 7a, 7b, and has its inner race ring 7a fixedly mounted on the small-diameter portion 1b of the stepped-diameter shaft 1 in an insertion manner.

Further, an outer diameter of the inner race ring 7a of the ball bearing unit 7 is equal to that of the large-diameter portion 1a of the stepped-diameter shaft 1, while an outer and an inner diameter of the second short outer race ring 7b are equal to those of the sleeve-like outer race ring 5, respectively. Consequently, all the balls 4, 8b are the same in diameter in the second embodiment of the motor of the present invention shown in FIG. 2.

In assembly operations of this second embodiment of the present invention, for example, the inner race ring 7a is initially slidably mounted on the small-diameter portion 1b of the stepped-diameter shaft 1 in an insertion manner, and then has its upper-end surface subjected to a predetermined pre-load. Under such circumstances, the inner race ring 7a is fixed to the small-diameter portion 1b of the shaft 1 by means of a suitable adhesive or other connecting means. Thus the inner race ring 7a, sleeve-like outer race ring 5 and the second short outer race ring 7b are successively mounted on the stepped-diameter shaft 1 to complete a compound bearing assembly used in the motor of the present invention.

Figure 3:
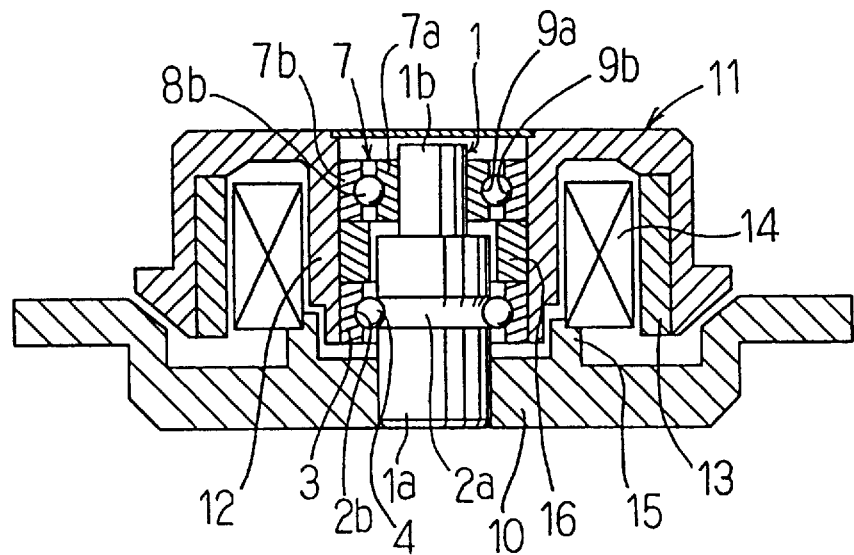
FIG. 3 is a longitudinal sectional view of a third embodiment of the electric drive motor of the outer-rotor type with the compound bearing assembly, according to the present invention.

FIG. 3 is a third embodiment of the outer-rotor type motor of the present invention provided with another compound bearing assembly.

In this third embodiment of the present invention, the inner raceway groove 2a is directly formed in an outer peripheral surface of the large-diameter portion 1a of the stepped-diameter shaft 1.

The first short outer race ring 3 is disposed on the large-diameter portion 1a of the shaft 1 and has its inner peripheral surface formed into the annular outer raceway groove 2b. A plurality of the second balls 4 are rotatably mounted between this outer raceway groove 2b and the inner raceway groove 2a of the large-diameter portion 1a of the shaft 1.

The conventional ball bearing 7, which is essentially constructed of the inner race ring 7a, second short outer race ring 7b and the third balls 8b, has its inner race ring 7a fixedly mounted on the small-diameter portion 1b of shaft 1 in an insertion manner.

A short sleeve 16 is coaxially disposed around the stepped-diameter shaft 1, and fixedly sandwiched between the first short outer race ring 3 and the second short outer race ring 7b of the ball bearing unit 7.

In this third embodiment of the present invention shown in FIG. 3, as is in the second embodiment of the present invention shown in FIG. 2, an outer diameter of the inner race ring 7a of the ball bearing unit 7 is equal to that of the large-diameter portion 1a of the stepped-diameter shaft 1, while an inner and an outer diameter of the second short outer race ring 7b of the ball bearing unit 7 are equal to those of the first short outer race ring 3 disposed around the large-diameter portion 1a of the shaft 1. Consequently, all the balls 4, 8b used in the third embodiment of the motor of the present invention are the same in diameter, as is clear from FIG. 3.

In assembly operations of this third embodiment of the present invention, the inner race ring 7a of the ball bearing unit 7 is initially slidably mounted on the small-diameter portion 1b of the shaft 1 in an insertion manner, and then has its upper-end surface subjected to a predetermined pre-load. Under such circumstances, the inner race ring 7a is fixed to the small-diameter portion 1b of the shaft 1 by means of a suitable adhesive and like connecting means. Thus the inner race ring 7a, first short outer race ring 3, short sleeve 16 and the second short outer race ring 7b are successively mounted on the shaft 1 to complete a compound bearing assembly used in the motor of the present invention.

Incidentally, in the ball bearing unit 7 shown in FIG. 3: the reference numerals 9a and 9b denote an annular inner and an annular outer raceway groove, respectively. The third balls 8b may be rotatably held in a conventional ball retainer (not shown).

In the first, second and the third embodiment of the present invention described above, although all the balls 4, 8a, 8b are the same in diameter, it is also possible for the balls to take any other sizes. Namely, the balls used in the large-diameter portion 1a of the shaft 1 may be different in diameter from those used in the small-diameter portion 1b of the shaft 1.

Figure 4:
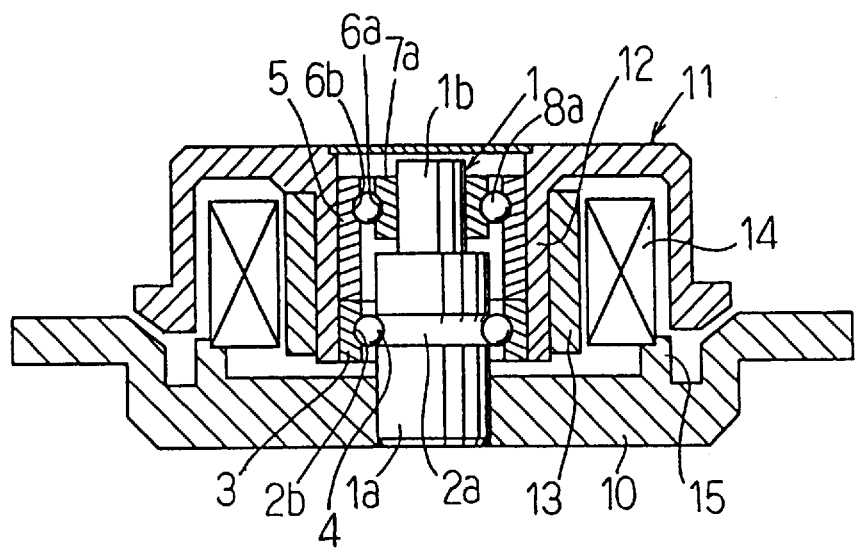
FIG. 4 is a longitudinal sectional view of a first embodiment of the electric drive motor of an inner-rotor type with the compound bearing assembly, according to the present invention.
Figure 5:
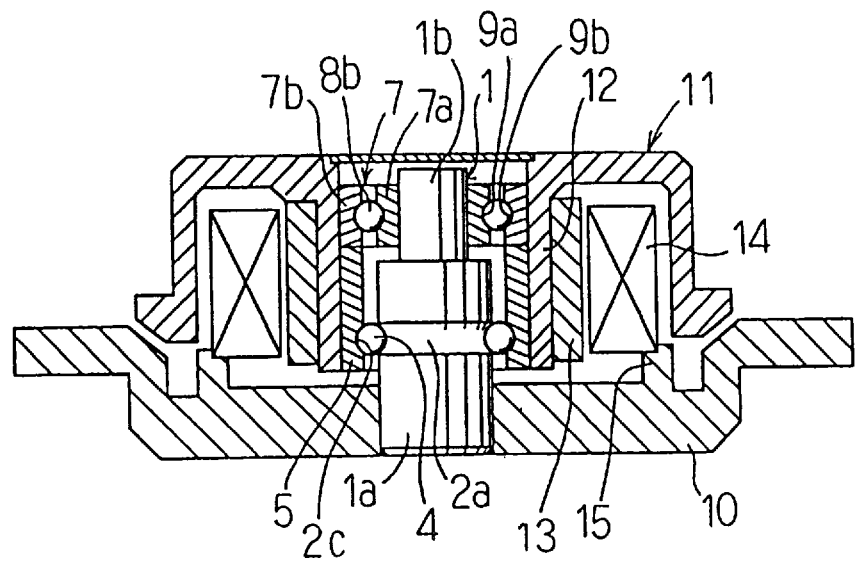
FIG. 5 is a longitudinal sectional view of a second embodiment of the electric drive motor of the inner-rotor type with the compound bearing assembly, according to the present invention.
Figure 6:
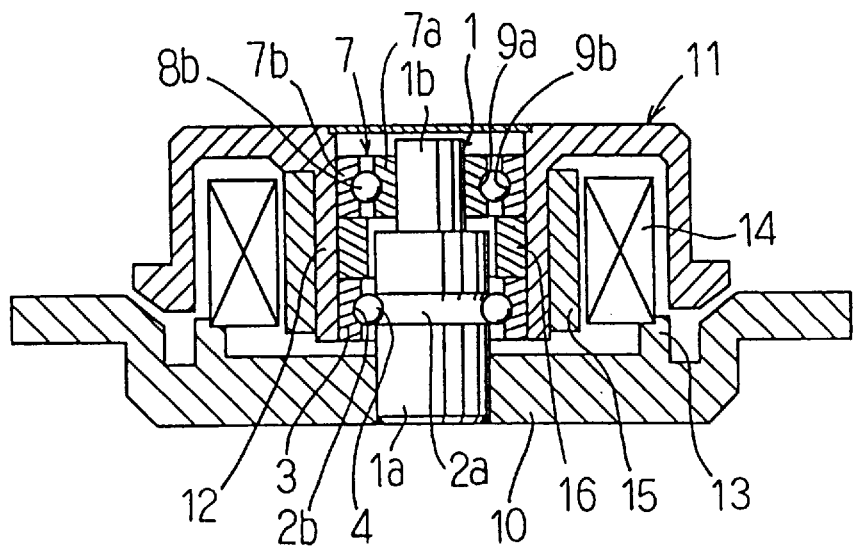
FIG. 6 is a longitudinal sectional view of a third embodiment of the electric drive motor of the inner-rotor type with the compound bearing assembly, according to the present invention.
Figure 7A:
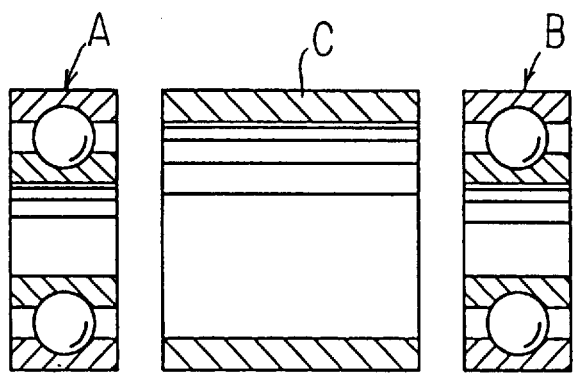
FIG. 7($a$) is a longitudinal sectional view of a conventional compound bearing assembly still not assembled, illustrating separated ball bearing units and a spacer.
Figure 7B:
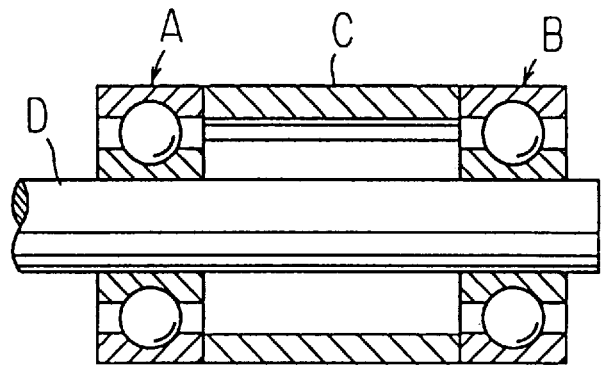

The above description is for the outer-rotor type motor of the present invention shown in FIGS. 1 to 3, while the following description is for a plurality of embodiments of the inner-rotor type motor of the present invention shown in FIGS. 4 to 6:

Namely, in each of the inner-rotor type motors of the present invention, the permanent magnet 13 is fixedly mounted on an outer peripheral surface of the central hub portion 12 of the rotor 11 of the motor, and the remaining construction is the substantially same as that of each of the embodiments shown in FIGS. 1 to 3. More particularly, as for the remaining construction, a fourth embodiment of the present invention shown in FIG. 4 corresponds to the first embodiment shown in FIG. 1; a fifth embodiment of the present invention shown in FIG. 5 corresponds to the second embodiment shown in FIG. 2; and a sixth embodiment of the present invention shown in FIG. 6 corresponds to the third embodiment shown in FIG. 3.

In the electric drive motor of the present invention, since the compound bearing assembly thereof has the above construction, the following action and effects are obtained:

(1) In the motor of the present invention, since substantially all the components of the compound bearing assembly, for example such as the outer race rings, inner race ring, balls and the sleeve used in the motor have been already assembled into the compound bearing assembly by a bearing manufacturer with high accuracy, the user or motor manufacturer is released from a cumbersome assembly work of the compound bearing assembly, the assembly being easily mounted inside a sleeve-like rotating element (i.e., central hub portion 12 of the rotor 11 of the motor) by inserting the assembly into the rotating element and fixing the assembly therein at the user's end;

(2) Since the compound bearing assembly used in the motor of the present invention uses the stepped-diameter shaft 1 provided with the large-diameter portion 1a which has its outer peripheral surface directly formed into the annular inner raceway groove 2a, it is possible for the compound bearing assembly to eliminate the conventional type inner race ring in the large-diameter portion 1a of the steppediameter shaft 1, which permits the shaft 1 to be partially increased in diameter, and, therefore improved in rigidity;

(3) Since the stepped-diameter shaft 1 is provided with the large-diameter portion 1a and therefore improved in rigidity, it is possible to increase the resonance point of the electric drive motor of the present invention having the compound bearing assembly, so that the motor with the compound bearing assembly may be prevented from resonating to the remaining components of the motor, whereby the motor of the present invention is improved in performance and reliability;

(4) The number of the conventional ball bearing units in the compound bearing assembly used in the motor of the present invention is only one which is the ball bearing unit 7. Consequently, the compound bearing assembly in the motor of the present invention uses only one inner race ring 7a, and is therefore reduced in the number of its components in comparison with the conventional bearing assemblies; and (5) Since the annular inner raceway groove 2a is directly formed in the outer peripheral surface of the large-diameter portion 1a of the shaft 1 in the motor of the present invention, no inner race ring is required in the large-diameter portion 1a of the shaft 1, which-enables all the first short outer race ring 3, sleeve-like outer race ring 5 and the spacer 16 of the compound bearing assembly used in the motor the present invention to be downsized in outer meter, and, therefore enables the motor of the sent invention to be also downsized so as to meet need in industry.

What is claimed is:

1. An electric drive motor with a compound bearing assembly characterized in that:

an annular inner raceway groove (2a) is directly formed in an outer peripheral surface of a large-diameter portion (1a) of a stepped-diameter shaft (1) provided with said large-diameter portion (1a) and a small-diameter portion (1b);

a plurality of first balls (4) are rotatably mounted between said inner raceway groove (2a) and an annular outer raceway groove (2b) formed in an inner peripheral surface of a first short outer race ring (3) disposed over said large-diameter portion (1a) of said stepped-diameter shaft (1);

a plurality of second balls (8b) are rotatably mounted between an inner race ring (7a) and a second short outer race ring (7b) in a ball bearing unit (7);

a sleeve-like spacer (16) is sandwiched between said second short outer race ring (7b) and said first short outer race ring (3) over said large-diameter portion (1a) of said stepped-diameter shaft (1);

said inner race ring (7a) of said ball bearing unit (7) is fixedly mounted on said small-diameter portion (1b) of said stepped-diameter shaft (1) in an insertion manner;

whereby a compound bearing assembly is assembled;

said compound bearing assembly has a base-end portion of said large-diameter portion (1a) of said stepped-diameter shaft (1) fixedly mounted on a base member (10) of a motor at right angles to permit said stepped-diameter shaft (1) to extend upward; and said compound bearing assembly is fixedly mounted in a central hub portion (12) of a rotor (11) of said motor in an insertion manner to complete an electric drive motor with said compound bearing assembly.

2. An electric drive motor with a compound bearing assembly comprising:

a stepped-diameter shaft (1) provided with a large-diameter portion (1a) and a small-diameter portion (1b);

a first annular inner raceway groove (2a) directly formed in an outer peripheral surface of said large-diameter portion (1a);

said small-diameter portion (1b) being fitted in an annular inner race ring (7a) in an insertion manner;

a second annular inner raceway groove formed in an outer peripheral surface of said annular inner race ring (7a);

an elongated sleeve-like outer race ring (5) covering a portion of said large-diameter portion (1a) and a portion of said small-diameter portion (1b) of said stepped-diameter shaft (1);

a single-piece short outer race ring (3) provided at one of axially opposite end portions of said elongated sleeve-like outer race ring (5);

a first annular outer raceway groove formed directly in an inner peripheral surface of another of said axially opposite end portions of said elongated sleeve-like outer race ring (5);

said short outer race ring (3) having a shorter length than said elongated sleeve-like outer race ring (5);

a second annular outer raceway groove formed in said short outer race ring (3);

a plurality of first balls (4) rotatably mounted in said first inner raceway groove (2a) of said large-diameter portion (1a) of said stepped-diameter shaft (1) and held therein by one of said first and second annular outer raceway grooves of said short outer race ring (3) and said inner peripheral surface of said sleeve-like outer race ring (5);

a plurality of second balls (8a) rotatably mounted in said second annular inner raceway groove formed in the outer peripheral surface of said inner race ring (7a), said second balls (8a) being held therein by the other of said first and second annular outer raceway grooves of said short outer race ring (3) and said inner peripheral surface of said sleeve-like outer race ring (5);

whereby said compound bearing assembly is assembled from the above-enumerated components;

said compound bearing assembly having a base-end portion of said large-diameter portion (1a) thereof fixedly mounted on a base member (10) of a motor at right angles to permit said stepped-diameter shaft (1) to extend therefrom; and said compound bearing assembly being fixedly mounted in a central hub portion (12) of a rotor (11) of said motor in an insertion manner to complete said motor provided with said compound bearing assembly.

3. The electric drive motor as set forth in claim 2, wherein:

said first balls (4), which are rotatably mounted in said first annular inner raceway groove (2*a*) of said large-diameter portion (1*a*) of said compound bearing assembly, are held by said second annular outer raceway groove (2*b*) formed in said single-piece short outer race ring (3); and said second balls (8*a*), which are rotatably mounted in said second annular inner raceway groove (6*a*) formed in said inner race ring (7*a*), are held by said first annular outer raceway groove (6*b*) formed directly in said inner peripheral surface of said elongated sleeve-like outer race ring (5).

4. The electric drive motor as set forth in claim 2, wherein:

said first balls (4), which are rotatably mounted in said first annular inner raceway groove (2*a*) of said large-diameter portion (1*a*) of said compound bearing assembly, are held by said first annular outer raceway groove (2*c*) formed directly in said inner peripheral surface of said elongated sleeve-like outer race ring (5); and said second balls (8*b*), which are rotatably mounted in said second annular inner raceway groove (9*a*) of said inner race ring (7*a*), are held by said second annular outer raceway groove (9*b*) formed in an inner peripheral surface of said single-piece short outer race ring (7*b*).

5. The electric drive motor as set forth in claim 2, wherein:

said first balls (4), which are rotatably mounted in said first annular inner raceway groove (2*a*) of said large-diameter portion (1*a*) of said compound bearing assembly, are held by said second annular outer raceway groove (2*b*) formed in said single-piece short outer race ring (3); and said second balls (8*a*), which are rotatably mounted in said second annular inner raceway groove (6*a*) formed in said inner race ring (7*a*) fixedly mounted on said small-diameter portion (1*b*) in an insertion manner, are held by said first annular outer raceway groove (6*b*) formed directly in said inner peripheral surface of said elongated sleeve-like outer race ring (5).

6. The electric drive motor as set forth in claim 2, wherein:

said first balls (4), which are rotatably mounted in said first annular inner raceway groove (2*a*) of said large-diameter portion (1*a*) of said compound bearing assembly, are held by said first annular outer raceway groove (2*c*) formed directly in said inner peripheral surface of said elongated sleeve-like outer race ring (5); and said second balls (8*b*), which are rotatably mounted in said second annular inner raceway groove (9*a*) of said inner race ring (7*a*) fixedly mounted on said small-diameter portion (1*b*) in an insertion manner, are held by said second annular outer raceway groove (9*b*) formed in an inner peripheral surface of said singlepiece short outer race ring (7*b*).

* * * * *